(12) United States Patent
Ayoub et al.

(10) Patent No.: US 6,674,845 B2
(45) Date of Patent: Jan. 6, 2004

(54) METHOD AND APPARATUS FOR CONNECTING BROADBAND VOICE AND DATA SIGNALS TO TELEPHONE SYSTEMS

(75) Inventors: Mark Ayoub, Alymer (CA); Rick Geiss, Kanata (CA); Chi-Keung Leung, Kanata (CA); Joe Lung, Kanata (CA)

(73) Assignee: Zarlink Semiconductor Inc., Kanata (CA)

( * ) Notice: Subject to any disclaimer, the term of this patent is extended or adjusted under 35 U.S.C. 154(b) by 287 days.

(21) Appl. No.: 09/885,405

(22) Filed: Jun. 21, 2001

(65) Prior Publication Data

US 2002/0015482 A1 Feb. 7, 2002

(30) Foreign Application Priority Data

Jun. 26, 2000 (GB) ............................................. 0015592

(51) Int. Cl.$^7$ ............................................. H04M 11/00
(52) U.S. Cl. ................. 379/93.05; 379/399.01
(58) Field of Search ..................... 379/93.05, 93.06, 379/93.08, 93.09, 93.28, 93.31, 399.01

(56) References Cited

U.S. PATENT DOCUMENTS

| | | | |
|---|---|---|---|
| 6,144,399 A | | 11/2000 | Manchester et al. ............ 348/6 |
| 6,295,343 B1 | * | 9/2001 | Hjartarson et al. ...... 379/93.05 |
| 6,323,686 B1 | * | 11/2001 | Bisson et al. ............... 379/394 |
| 6,324,268 B1 | * | 11/2001 | Balachandran et al. .. 379/93.08 |

FOREIGN PATENT DOCUMENTS

| | | |
|---|---|---|
| EP | 0 802 649 A1 | 10/1997 |
| EP | 0 854 619 A1 | 7/1998 |
| WO | 99/21333 | 4/1999 |

* cited by examiner

*Primary Examiner*—Stella Woo
(74) *Attorney, Agent, or Firm*—Marks & Clerk

(57) ABSTRACT

In an apparatus for supplying a tip and ring telephone line with voice band and broadband signals, a first pair of drivers supply at least DC signals to the respective tip and ring line components, and a second pair of drivers supply broadband signals to the tip and ring line components. Feed components combine the outputs of said respective drivers for the respective tip and ring components of the telephone line.

14 Claims, 2 Drawing Sheets

METHOD AND APPARATUS FOR CONNECTING BROADBAND VOICE AND DATA SIGNALS TO TELEPHONE SYSTEMS

FIELD OF THE INVENTION

This invention relates to the field of telephony, and in particular to a method and apparatus for connecting broadband voice and data signals to telephone systems. The invention is suitable for, but not limited to, interfacing a DSL analog front end circuit to a subscriber line in the presence of a voice band (DC-4000 Hz) signal. DSL (Digital Subscriber Line) is a service that permits broadband data signals to be superimposed on local subscriber loops.

BACKGROUND OF THE INVENTION

With the popularity of the Internet, telephone companies are offering more and more broadband services to subscribers. One such service is DSL (Digital Subscriber Line) wherein the voice band Plain Old Telephone Service (POTS) and the higher frequency band DSL service are put onto the same pair of copper wires at the same time. However, this gives rise to several problems. Both the DC and AC requirements for the voice band POTS and the DSL service are different. POTS requires a DC voltage and current for line signaling and voice transmission while DSL service only operates in AC mode. The line impedance for POTS lines ranges from 600 to 1000 ohms either real or complex, while the DSL line impedance is around 100 ohms.

When POTS is in the on-hook state, no voice (AC) signal is transmitted onto the tip/ring pair. There is about 40V to 48V DC voltage across tip and ring. Usually, the tip DC voltage is around 0V to −5V and the ring DC voltage is around −40V to −56V. A typical DSL signal has a peak voltage of about 18V. When the DSL signal is transmitted during the POTS on-hook state, the typical signal at tip and ring is as shown in FIG. 2.

There are currently two common approaches for providing both POTS and DSL service on the same tip/ring pair. One approach is to use a transformer and a splitter. The splitter consists of two capacitors to the DSL interface connection and a low pass filter (LPF) for the POTS connection as shown in FIG. 3.

The two capacitors act as a high pass filter and isolate the DSL line impedance from the voice band POTS line. The capacitors also isolate the DC voltage for POTS line from the DSL line driver. The drawback of this method is the need for the relatively expensive and bulky transformer and splitter.

The other approach is to use common solid state differential drivers to directly drive both POTS signals and DSL signal onto the common copper wire pair as illustrated in FIG. 4. The total feeding impedance, $2Z_f$, is set to that of the DSL load impedance. As shown in FIG. 2, the DSL signal requires an AC swing of about 40Vpp. POTS requires a DC voltage of about 40V to 48V between tip and ring when the line is in onhook (idle) state to meet Central Office (CO) requirements. In the case of DSL signal transmission during POTS on-hook state, the drivers need a DC supply voltage of about 80V (V+minus V−equals to 80V) to drive signals onto tip and ring as illustrated in FIG. 2.

For a typical DSL load of 100 ohms and a signal of 3Vrms, the drivers need to provide about 30 mA. Hence the power consumption is around 2.4 W for a 80V power source. In this configuration, about 50% of the power is wasted in the line drivers due to the fact that they need to be biased to 80V instead of 40V to provide the required tip/ring DC voltage. The power dissipated through the DSL load and the feeding component is about 0.2 W, $(2\times(100\ ohms \times 30\ mA^2))$. Hence the power dissipation in the drivers is about 2.2 W. For normal integrated voice and data telephone line service, the majority of the time the POTS line is in on-hook state while DSL line is active. It makes the common solid state driver very power inefficient.

An object of the invention is to alleviate this problem.

SUMMERY OF THE INVENTION

According to the present invention there is provided an apparatus for supplying a tip and ring telephone line with voice band and broadband signals, comprising a first pair of drivers for supplying at least DC signals to said respective tip and ring line components, a second pair of drivers for supplying broadband signals to said tip and ring line components, and feed components for combining the outputs of said respective drivers for said respective tip and ring components of the telephone line.

The broadband signals are typically DSL signals. The voice band signals can either be passed through the first pair of drivers with the DC signals or the second pair of drivers with the broadband signals.

In one embodiment the feed components match the output impedance to the line impedance in the frequency band of the broadband signals, whereas the output impedance in the voice band is matched by feedback of the voice band transmit signal.

The drivers are typically solid state integrated circuits devices.

The invention also provides a method of improving power efficiency in the transmission of integrated voice and broadband service on a tip and ring telephone, comprising supplying at least DC signals through a first pair of drivers for to said respective tip and ring line components, supplying broadband signals to a second pair of drivers for said tip and ring line components, and combining the outputs of said respective drivers with feed components for said respective tip and ring components of the telephone line.

BRIEF DESCRIPTION OF THE DRAWINGS

The invention will now be described in more detail by way of example only, with reference to the accompanying drawings, in which.

DETAILED DESCRIPTION OF THE PREFERRED EMBODIMENTS

Figure 1:
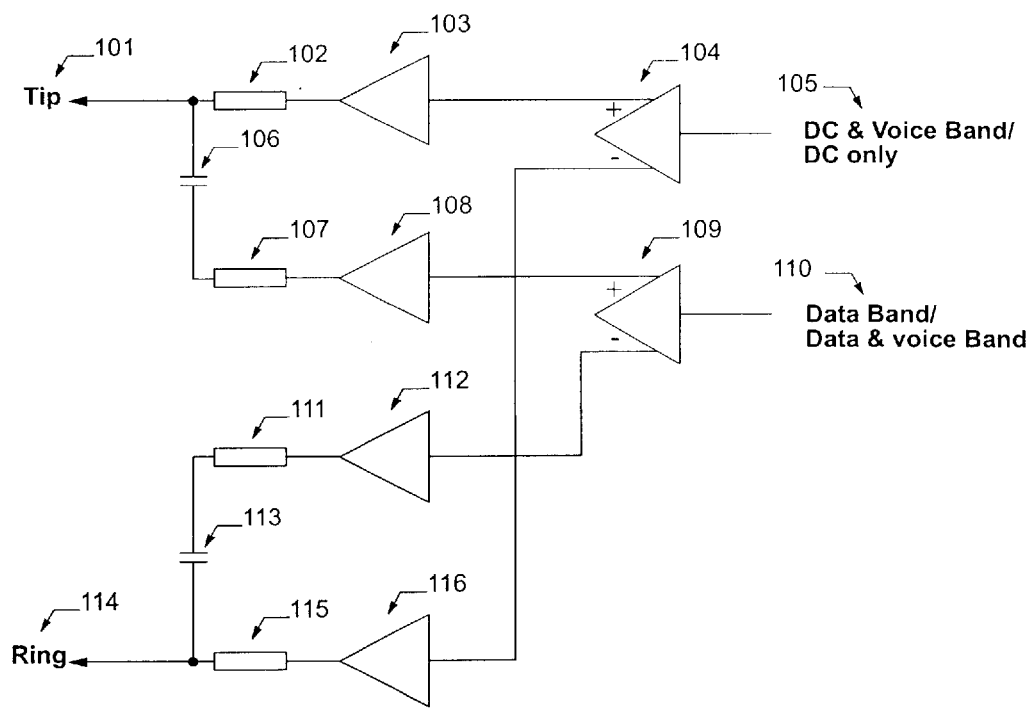
FIG. 1 is a block diagram of a connection circuit in accordance with the principles of the invention.
Figure 2:
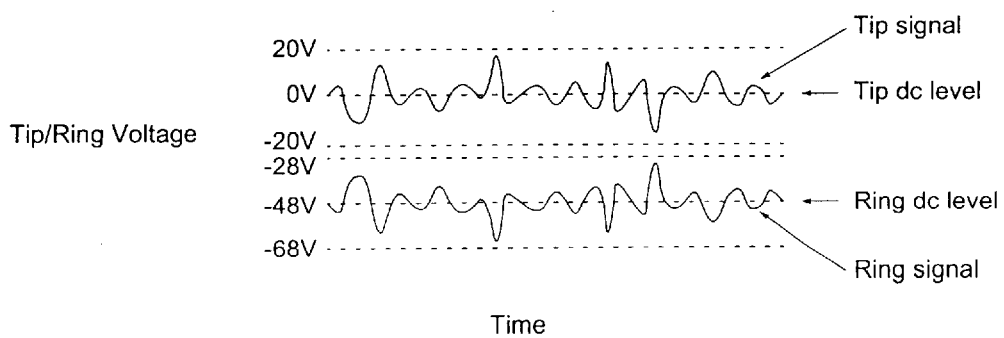
FIG. 2 shows the tip/ring voltage in a POTS on-hook state with DSL transmission.
Figure 3:
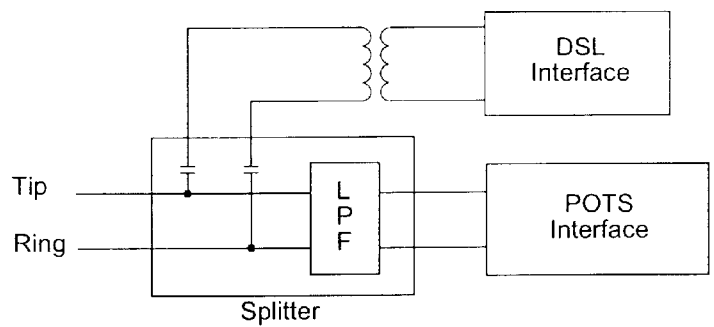
FIG. 3 shows a transformer and capacitor coupled DSL driver.
Figure 4:
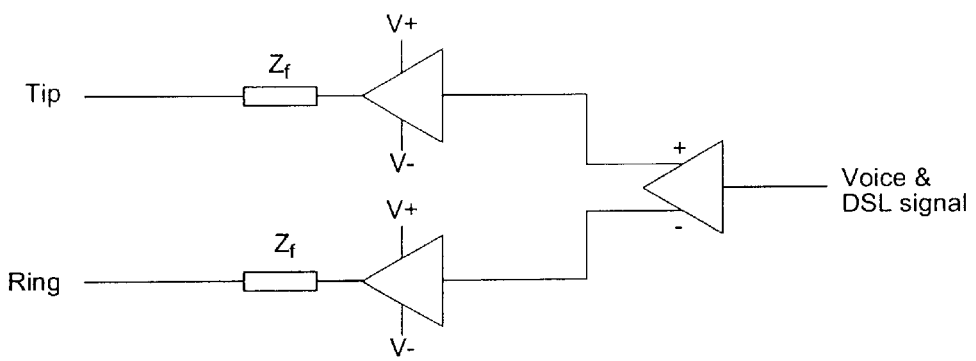
FIG. 4 shows a direct drive for POTS and DSL transmission.

In FIG. 1, which shows a circuit in accordance with the principles of the invention, input signals 105, 110 are fed to respective differential amplifiers 104, 109. Signal 105 can include DC signals only, or it can also include voice band, but not broadband signals. Signal 110 includes the broadband signals, typically DSL signals, and optionally the voice band signals if they are not included in signal 105.

The non-inverting outputs of differential amplifiers 104, 109 are fed respectively to the inputs of drivers 103 and 108, connected through feed network 102, 106, 107 to tip component 101 of the telephone line. The inverting outputs of differential amplifiers 104, 109 are fed respectively to the inputs of drivers 116, 112 connected through feed network 111, 115, 113 to ring component 114 of the telephone line.

Drivers 103 and 116 have a working bandwidth from DC to a minimum of 4 KHz. There are at least two ways to use the drivers 103 and 116.

Drivers 103 and 116 can function in a similar way to conventional POTS only SLIC (Single Line Interface Circuit) drivers. Driver 103 and driver 116 are used to provide the tip/ring DC line voltage and loop current, to transmit the voice, ringing, and other voice band signals onto tip 101 and ring 114 through feeding impedances 102 and 115 in both on-hook or off-hook state. The DC voltages on tip and ring can vary between around 0V to around −60V as defined in the specific CO application requirement. Depending on whether balance or unbalance ringing is supported or not, the DC supply to the drivers 103 and 116 can vary between around 50V to 200V. Any DC voltages from data drivers 108 and 112 are blocked by capacitors 106 and 113 from interfering with the DC voltages on tip 101 and ring 114 and vice versa.

Drivers 103 and 116 can also only provide the conventional POTS DC line signaling voltages and loop current without transmission of any voice band AC signal.

Depending on the overall system architecture of the SLIC, drivers 103 and 116 can only provide DC signals or DC and AC voice band signals simultaneously.

AC Signal Drivers

The differential drivers 108 and 112 are used to transmit AC signal onto tip 101 and ring 114. The AC signal can be DSL type data band signal only or the DSL type data band signal and the POTS voice band signal simultaneously. Depending on the overall system architecture of the SLIC, the type of AC signal can be DSL type signal only or DSL type plus voice band signals.

The differential drivers 108 and 112 transmit the AC signal onto tip 101 and ring 114 through feeding impedances 107 and 111 and capacitors 106 and 113. As capacitors 106 and 113 block any DC voltages from tip 101 and ring 114 from the AC signal drivers 108 and 112, the output of drivers 108 and 112 can be biased at any DC voltage level as is convenient for the driver design. The AC signal drivers 108 and 112 only need to meet the maximum AC signal amplitude requirement. The maximum amplitude is around 40Vpp for DSL type signal and is much lower for POTS voice band signal. Assuming that the output impedance at tip 101 and ring 114 equals to the DSL load impedance at the DSL signal frequency band, the maximum swing of driver 108 or 112 equals to that of the maximum data band signal. As the voice band signal also has a much less maximum amplitude, therefore the supply voltage to drivers 108 and 112 equals to the maximum data band signal swing plus the driver overhead. For DSL type signal, the maximum signal swing is about 40Vpp. Therefore the supply voltage needed for drivers 108 and 112 is around 45V to 50V. This supply voltage is totally independent of the POTS DC voltage requirement.

The line impedance can be set by either the passive feeding components 102, 106, 107, 111, 113, and 115 alone or the passive feeding components together with transmit signal feedback from tip 101 and ring 114 through a real time transfer function back onto tip 101 and ring 114 again.

The line impedance value changes according to the signal frequency band. In the voice band (300-4000 Hz), the line impedance meets POTS line impedance requirement. The actual value depends on the CO application and ranges from 600 ohms to 1000 ohms, real or complex. For DSL transmission, the line impedance is around 100 ohms within the transmission bandwidth. The requirement for line impedance for POTS is much more stringent than that for the DSL type lines. One preferred way to achieve both the POTS line impedance requirement and DSL line impedance is by setting the passive feeding components 102, 106, 107, 111, 113, and 115 to the DSL line impedance in the DSL frequency band and using voice band transmit signal feedback with the passive feeding components to provide the POTS line impedance within the voice frequency band.

The total power consumption of the Universal SLIC tip/ring drivers is the sum of the power consumption of the drivers 103 and 116 and the drivers 108 and 112. The power consumption of each set of drivers is independent of the operation of the each other. The biggest improvement in power consumption when compared to a single differential tip/ring drivers is when DSL line is operating during the POTS on-hook state.

In POTS on-hook state, there is no DC current going through the tip/ring loop. The power consumption of the drivers 103 and 116 is only needed to set up the DC biasing of tip 101 and ring 114. This power consumption is totally independent of the operation of the AC signal drivers 108 and 112 as there is no DC current flowing through the DSL load and drivers are all AC coupled. For high efficient driver design, drivers 103 and 116 can consume as low as 0.1 W.

The power consumption for the AC drivers 108 and 112 equals to the sum of the currents through the DSL load and the POTS driver feeding components 102 and 115 multiplied by the driver supply voltage. For typical DSL operation, the total current is about 30 mA and the driver supply voltage is about 40V. Therefore, the power consumption for the DSL line operation is about 1.2 W. Together with the 0.1 W for the DC drivers, the total power consumption is about 1.3 W. This saves about 1.1 W when compared to 2.4 W consumed by a single differential tip/ring driver pair as illustrated in section 2.

With feeding impedance matching that of the DSL load at around 100 ohm, the power dissipated in the DSL load and feeding impedance is about 0.18 W (200 W×30 mA$^2$). The power dissipation in the drivers is about 1.12 W (1.3 W−0.18 W) compared to 2.22 W (2.4 W−0.18 W) for a common AC and DC driver design as illustrated in section 2.

When DSL line is in idle, the power consumption of the data band drivers 108 and 112 is about 0.1 W.

In POTS ringing or off-hook states, the power consumption of the drivers 103 and 116 is of that of typical POTS only driver designs plus the product of the current through the AC driver feeding components 106, 107, 111, and 113 and the POTS driver supply voltage, in the case that voice band signal is transmitted through drivers 101 and 106. In the case that voice band signal is transmitted through the AC drivers 108 and 112, the overall power consumption is less than that of using drivers 103 and 116 due to the fact that the supply voltage for the AC drivers 108 and 112 is less than that for the drivers 103 and 116.

The described apparatus avoids the use of a transformer and splitter in a system requiring the transmission of both voice and data over the same communications medium while the power efficiency of integrated voice and DSL service.

What is claimed is:

1. An apparatus for supplying a tip and ring telephone line with voice band and broadband signals, comprising a first pair of drivers for supplying at least DC signals to said respective tip and ring line components, a second pair of drivers for supplying broadband signals to said tip and ring line components, and feed components for combining the outputs of said respective drivers for said respective tip and ring components of the telephone line, said feed components comprising passive impedance components including capacitors to isolate said second pair of drivers from DC signals.

2. An apparatus as claimed in claim 1, wherein said second pair of drivers are differential drivers.

3. An apparatus as claimed in claim 1, further comprising a pair of differential amplifiers receiving respectively a first signal comprising at least said DC signals, and a second signal comprising said broadband signal, a first pair of outputs of said differential amplifiers feeding respectively the drivers connected to the tip component of telephone line, and a second pair of outputs of said differential amplifiers feeding respectively the drivers connected to the ring component of the telephone line.

4. An apparatus as claimed in claim 3, wherein the non-inverting outputs of said differential amplifiers feed the drivers connected to the tip component of telephone line, and the inverting outputs of said differential amplifiers feed the drivers connected to the ring component of the telephone line.

5. An apparatus as claimed in claim 1, wherein said feed components are set to the line impedance in the broadband signal frequency band and voice band feed back of the transmit signal is employed to provide an output impedance matching the line impedance in the voice band.

6. An apparatus as claimed in claim 5, wherein said broadband signal is a DSL signal.

7. A method of improving power efficiency in the transmission of integrated voice and broadband service on a tip and ring telephone, comprising supplying at least DC signals through a first pair of drivers for to said respective tip and ring line components, supplying broadband signals to a second pair of drivers for said tip and ring line components, and combining the outputs of said respective drivers with feed components for said respective tip and ring components of the telephone line, said feed components comprising passive impedance components including capacitors to isolate said second pair of drivers from DC signals.

8. A method as claimed in claim 7, wherein said second pair of drivers are differential drivers.

9. A method as claimed in claim 7, further comprising a first signal comprising at least said DC signals and a second signal comprising said broadband signal are passed respectively through a pair of differential amplifiers, and a first pair of outputs of said differential amplifiers are fed to the drivers connected to the tip component of telephone line, and a second pair of outputs of said differential amplifiers are fed respectively to the drivers connected to the ring component of the telephone line.

10. A method as claimed in claim 9, wherein the non-inverting outputs of said differential amplifiers feed the drivers connected to the tip component of telephone line, and the inverting outputs of said differential amplifiers feed the drivers connected to the ring component of the telephone line.

11. A method as claimed in claim 7, wherein said feed components are set to the line impedance in the broadband signal frequency band, and the transmit signal in the voice band is fed to provide an output impedance matching the line impedance in the voice band.

12. A method as claimed in claim 7, wherein both voice band and DC signals are supplied through said first pair of drivers.

13. A method as claimed in claim 12, wherein only DC signals are supplied through said first pair of drivers and both voice band and broadband signals are supplied through said second pair of drivers.

14. A method as claimed in claim 7, wherein said broadband signals are DSL signals.

* * * * *